(12) United States Patent
Müller et al.

(10) Patent No.: US 7,659,358 B2
(45) Date of Patent: *Feb. 9, 2010

(54) BINDERS CONTAINING ORTHO ESTER GROUPS

(75) Inventors: Hanns-Peter Müller, Odenthal (DE); Meike Niesten, Köln (DE); Jörg Schmitz, Köln (DE); Holger Mundstock, Wermelskirchen (DE)

(73) Assignee: Bayer MaterialScience AG, Leverkusen (DE)

( * ) Notice: Subject to any disclaimer, the term of this patent is extended or adjusted under 35 U.S.C. 154(b) by 76 days.

This patent is subject to a terminal disclaimer.

(21) Appl. No.: 11/037,294

(22) Filed: Jan. 18, 2005

(65) Prior Publication Data

US 2005/0165199 A1 Jul. 28, 2005

(30) Foreign Application Priority Data

Jan. 23, 2004 (DE) ........................ 10 2004 003 495

(51) Int. Cl.
- *C08G 18/77* (2006.01)
- *C07C 69/74* (2006.01)
- *C07C 69/757* (2006.01)
- *B32B 27/40* (2006.01)

(52) U.S. Cl. ...................... 528/73; 428/423.1; 560/119; 560/199; 568/595

(58) Field of Classification Search ............... 528/49, 528/74, 73; 568/595; 560/119, 199; 428/423.1
See application file for complete search history.

(56) References Cited

U.S. PATENT DOCUMENTS

| | | | | |
|---|---|---|---|---|
| 3,354,100 A | 11/1967 | Kuryla | | 260/2.5 |
| 4,204,051 A * | 5/1980 | Wellner et al. | | 528/55 |
| 4,338,240 A | 7/1982 | Mizutani et al. | | 524/284 |
| 4,385,171 A | 5/1983 | Schnabel et al. | | 528/491 |
| 4,425,473 A | 1/1984 | Mizutani et al. | | 549/363 |
| 4,837,359 A | 6/1989 | Woynar et al. | | 560/335 |
| 4,994,541 A | 2/1991 | Dell et al. | | 528/51 |
| 5,103,045 A | 4/1992 | Robin et al. | | 560/335 |
| 5,124,427 A | 6/1992 | Potter et al. | | 528/67 |
| 5,162,448 A * | 11/1992 | Khouri et al. | | 525/390 |
| 5,208,334 A | 5/1993 | Potter et al. | | 544/193 |
| 6,297,329 B1 | 10/2001 | van den Berg et al. | | 525/410 |
| 6,593,479 B2 | 7/2003 | van den Berg et al. | | 549/363 |
| 6,765,111 B1 | 7/2004 | Pedain et al. | | 560/351 |
| 2002/0161135 A1 | 10/2002 | Berg et al. | | 525/410 |

FOREIGN PATENT DOCUMENTS

| | | |
|---|---|---|
| CA | 2 300 997 | 3/1999 |
| EP | 1 225 172 | 7/2004 |
| GB | 1101410 | 1/1968 |

OTHER PUBLICATIONS

Stabilization of Polymeric Materials, (month unavailable) 1997, pp. 181-213, H. Zweifel, "Appendix 3".

* cited by examiner

*Primary Examiner*—Vasu Jagannathan
*Assistant Examiner*—Benjamin J Gillespie
(74) *Attorney, Agent, or Firm*—Robert S. Klemz; Noland J. Cheung

(57) ABSTRACT

A process for preparing polymers containing polyortho ester groups and optionally NCO groups by reacting A) and B) where A) is a polyortho ester containing at least one isocyanate-reactive group prepared by reacting at least one or more acyclic ortho esters with low molecular weight polyols having a functionality of 4-8 and a number-average molecular weight of 80-500 g/mol and B) is least one polyisocyanate. The polymers obtained from the process can be used to produce coatings, adhesive bonds and/or seals. The coating compositions can include one or more of the above-described polymers, optionally polyisocyanates, catalysts, and optionally auxiliaries and additives and can be used to coat substrates.

19 Claims, No Drawings

BINDERS CONTAINING ORTHO ESTER GROUPS

CROSS REFERENCE TO RELATED PATENT APPLICATION

The present patent application claims the right of priority under 35 U.S.C. § 119 (a)-(d) of German Patent Application No.10 2004 003 495.8, filed Jan. 23, 2004.

BACKGROUND OF THE INVENTION

1. Field of the Invention

This invention relates to novel binders containing NCO and polyortho ester groups, to a process for preparing them and to their use.

2. Description of the Prior Art

Polyortho esters come about through the transesterification of acyclic ortho estes with polyfunctional alcohols. Since formation of polyortho ester under acid catalysis in an aqueous medium is reversible, (poly)ortho ester groups can be considered latent or masked OH groups. Through hydrolysis the OH groups are released so that the acyclic ortho ester initially used for masking is not entirely eliminated, therefore remaining in the polymer. This system, accordingly, represents a latent OH compound free from elimination products.

EP-B 882 106 describes coating materials based on crosslinkers containing bicyclic ortho ester groups as latent OH groups. Hydrolysis and crosslinking of these bicyclic ortho ester groups is accomplished in accordance with the same principle as in the case of the polyortho esters. Coating materials of this kind result in fast-drying films possessing excellent chemical resistance.

DE-A 31 03 779 and DE-A 31 28 217 describe stoichiometric adducts of OH-containing bicyclic ortho esters with polyisocyanates, giving polyurethanes containing bicyclic ortho ester groups as reactive functions. These functions can then be crosslinked with one another via cationic ring-opening homopolymerization in the absence of atmospheric moisture.

WO 99/10397 A1 discloses compounds which in addition to bicyclic ortho ester groups also have free NCO groups, so that they can be cured self-crosslinkingly following deblocking of the latent OH groups.

Countering their very rapid drying rate on crosslinking with isocyanates, however, bicyclic ortho ester groups as latent OH groups have the disadvantage that their preparation and incorporation into relatively high molecular mass compounds, which are then suitable for producing paints and plastics, involves multistage syntheses.

DE-A 26 25 392 and EP-A 1 225 172 describe the blocking of polyols with acyclic ortho esters and the use of these masked polyols in combination with polyisocyanates to prepare polyurethanes. The deblocking of the OH groups takes place in this case following application, as a result of the effect of atmospheric moisture. As compared with conventional 2K (two-component) PU systems based on polyacrylates and aliphatic polyisocyanates, however, there is no rate advantage attaching to the crosslinking.

For automotive refinish materials the demand is for fast-drying paints, and particularly paints based on linear-aliphatic isocyanates. The reason for this lies in their good film properties such as, for example, good mechanical and chemical resistance, good film optical qualities, and efficient processing (few spray passes, fast drying). In order to increase productivity a primary requirement is for even faster drying than has been possible to date using 2K PU coating materials. Additionally, for reasons of application reliability, very long pot lives are required.

SUMMARY OF THE INVENTION

The present invention is directed to a process for preparing polymers containing polyortho ester groups and optionally NCO groups by reacting A) and B) where A) is a polyortho ester containing at least one isocyanate-reactive group prepared by reacting at least one or more acyclic ortho esters with low molecular weight polyols having a functionality of 4-8 and a number-average molecular weight of 80-500 g/mol and B) is least one polyisocyanate.

The present invention also provides polymers containing polyortho ester groups and optionally NCO groups prepared according to the above-described process.

The present invention additionally provides a method of producing coatings, adhesive bonds and/or seals that includes combining the above-described polymers containing polyortho ester and optionally NCO groups according with one or more auxiliaries or additives selected from the group consisting of solvents, surface-active substances, internal release agents, fillers, dyes, pigments, flame retardants, hydrolysis stabilizers, microbiocides, flow assistants, antioxidants, UV-absorbers, and combinations thereof.

The present invention further provides coating compositions that include a) one or more of the above-described polymers containing polyortho ester and optionally NCO groups, b) optionally polyisocyanates, c) catalysts, and d) optionally auxiliaries and additives as described above.

The present invention still further provides coatings obtained from the above-described polymers containing polyortho ester and optionally NCO groups as well as substrates coated with such coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The present invention provides fast-drying paints having good film properties such as good mechanical and chemical resistance, good film optical qualities, and efficient processing.

Thus, it has now been found that polyortho esters of specific compositions, in combination with polyisocyanates, lead to adducts containing masked OH groups and optionally free NCO groups, which can be used as binders in fast-drying polyurethane coating systems.

The invention accordingly provides a process for preparing polymers containing polyortho ester groups and optionally NCO groups, wherein A) a polyortho ester containing at least one isocyanate-reactive group is prepared by reacting
  A1) one or more acyclic ortho esters with
  A2) low molecular weight polyols having a functionality of 4-8 and a number-average molecular weight of 80-500 g/mol and
  A3) optionally a 1,3-diol and/or a triol, the hydroxyl groups being separated from one another by at least 3 carbon atoms,
  optionally in the presence of
  A4) catalysts and
B) this polyortho ester is subsequently reacted with at least one polyisocyanate.

In component A1) it is possible for example to use triethyl orthoformate, triisopropyl orthoformate, tripropyl orthoformate, trimethyl orthobutyrate, triethyl orthoacetate, trimethyl orthoacetate, triethyl orthopropionater, trimethyl orthovalerate. Preference is given to the use of triethyl orthoformate, triethyl orthoacetate, trimethyl orthoacetate and/or triethyl orthopropionate, particular preference to triethyl orthoacetate and triethyl orthopropionate.

The aforementioned compounds can be used in component A1) individually or in any desired mixtures with one another.

Examples that may be mentioned of compounds of component A2) include pentaerythritol, ditrimethylolpropane, erythritol, diglyceride, bis(trimethylolpropane), dipentaerythritol, mannitol or methylglycoside. It is preferred to use pentaerythritol in A2).

Examples of 1,3-diols of component A3) are neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, dimethylolpropionic acid, dimethylolbutanoic acid, 2-ethyl-1,3-octanediol and 1,3-dihydroxycyclohexane; fatty acid monoglyceride (β products) such as, for example, glyceryl monoacetate (β product) and glyceryl monostearate (β product). Preference is given to neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol and 2-butyl-2-ethyl-1,3-propanediol.

Examples of triols of component A3) are 1,2,3-propanetriol, 1,2,4-butanetriol, 1,1,1-trimethylolethane, 1,2,6-hexanetriol, 1,1,1-trimethylolpropane and polyester-based triols having a number-average molecular weight of from 100 to 1000 g/mol. The latter can be prepared, for example, from the aforementioned triols by reaction with lactones, such as ε-caprolactone, β-propiolactone, γ-butyrolactone, γ- and δ-valerolactone, 3,5,5- and 3,3,5-trimethylcaprolactone or any desired mixtures of such lactones. A preferred triol of component A3) is trimethylolpropane.

The equivalent ratio of groups of the compounds of component A1) to be transesterified to the OH groups of the compounds of components A2) and A3) is preferably from 1:1.3 to 1:1.5.

As catalysts for the transesterification reaction in step A) it is possible to use the esterification catalysts known per se to the skilled person, such as acids, bases or transition metal compounds Preference is given to Lewis or Broenstedt acids; p-toluenesulphonic acid is particularly preferred.

They are used in the process of the invention in amounts of from 0.001 to 5% by weight, preferably from 0.01 to 1% by weight, based on the sum of the amounts of components A1)-A3).

The reaction temperature of the transesterification in step A) is 50-200° C., preferably from 75 to 1 50° C. In one preferred embodiment of the invention the alcohol eliminated in the course of the transesterification is removed from the reaction mixture by distillation, employing reduced pressure if appropriate. In this way it is easy to recognize not only the shift in equilibrium but also the end of the transesterification reaction, since the said reaction is over when elimination product (alcohol) is no longer distilled over.

Polyisocyanates which can be used in step B) of the process of the invention include all organic polyisocyanates preferably having an average NCO functionality of at least 2 and a molecular weight of at least 140 g/mol. Particular suitability is possessed by (i) unmodified organic polyisocyanates of the molecular weight range 140 to 300 g/mol, (ii) paint polyisocyanates with a molecular weight in the range from 300 to 1000 g/mol, and (iii) NCO prepolymers containing urethane groups and having a molecular weight of more than 1000 g/mol, or mixtures of (i) to (iii).

Examples of polyisocyanates of group (i) are 1,4-diisocyanatobutane, 1,6-diisocyanatohexane (HDI), 1,5-diisocyanato-2,2-dimethylpentane, 2,2,4- and/or 2,4,4-trimethyl-1,6-diisocyanatohexane, 1-isocyanato-3,3,5-trimethyl-5-isocyanatomethylcyclohexane (IPDI), 1-isocyanato-1-methyl-4-(3)-isocyanatomethylcyclohexane, bis(4-isocyanatocyclohexyl)methane, 1,10-diisocyanatodecane, 1,12-diisocyanatododecane, cyclohexane 1,3- and 1,4-diisocyanate, xylylene diisocyanate isomers, triisocyanatononane (TIN), 2,4-diisocyanatotoluene or its mixtures with 2,6-diisocyanatotoluene, with preferably—based on mixtures—up to 35% by weight of 2,6-diisocyanatotoluene, 2,2'-, 2,4'-, 4,4'-diisocyanatodiphenylmethane or technical polyisocyanate mixtures of the diphenylmethane series, or any desired mixtures of the said isocyanates. Preference is given to employing the polyisocyanates of the diphenylmethane series, more preferably in the form of isomer mixtures.

Polyisocyanates of group (ii) are the paint polyisocyanates known per se. The term "paint polyisocyanates" means, for the purposes of the invention, compounds or mixtures of compounds which are obtained by conventional oligomerization reaction of simple diisocyanates of the kind exemplified under (i). Examples of suitable oligomerization reactions are carbodiimidization, dimerization, trimerization, biuretization, urea formation, urethanization, allophanatization and/or cyclization with the formation of oxadiazine structures. Often, in the couse of "oligomerization", a number of the said reactions proceed simultaneously or in succession.

The "paint polyisocyanates" (ii) are preferably biuret polyisocyanates, polyisocyanates containing isocyanurate groups, polyisocyanate mixtures containing isocyanurate and uretdione groups, polyisocyanates containing urethane and/or allophanate groups, or polyisocyanate mixtures containing isocyanurate groups and allophanate groups, based on simple diisocyanates.

The preparation of such paint polyisocyanates is known and is described for example in DE-A 1 595 273, DE-A 3 700 209 and DE-A 3 900 053 or in EP-A-0 330 966, EP-A 0 259 233, EP-A-0 377 177, EP-A-0 496 208, EP-A-0 524 501 or U.S. Pat. No. 4,385,171.

Polyisocyanates of group (iii) are the conventional prepolymers containing isocyanate groups and based on simple diisocyanates of the type exemplified above and/or based on paint polyisocyanates (ii) on the one hand and organic polyhydroxy compounds with a molecular weight of more than 300 g/mol on the other. Whereas the paint polyisocyanates of group (ii) containing urethane groups are derivatives of low molecular weight polyols from the molecular weight range 62 to 300 g/mol—suitable polyols are, for example, ethylene glycol, propylene glycol, trimethylolpropane, glycerol or mixtures of these alcohols, the NCO prepolymers of group (iii) are prepared using polyhydroxyl compounds with a molecular weight of more than 300 g/mol, preferably more than 500 g/mol, more preferably a molecular weight situated between 500 and 8000 g/mol. Particular such polyhydroxyl compounds are those containing per molecule from 2 to 6, preferably 2 to 3, hydroxyl groups and selected from the group consisting of ether, ester, thioether, carbonate and polyacrylate polyols and mixtures of such polyols.

In the preparation of the NCO prepolymers (iii) it is possible additionally to employ the said relatively high molecular weight polyols in blends with the said low molecular weight polyols, so resulting directly in mixtures of low molecular weight paint polyisocyanates (ii), containing urethane groups, and relatively high molecular weight NCO prepolymers (iii), which are likewise suitable as starting component (C) according to the invention.

To prepare the NCO prepolymers (iii) or mixtures thereof with the paint polyisocyanates (ii), diisocyanates (i) of the type exemplified above or paint polyisocyanates of the type exemplified under (ii) are reacted with the relatively high molecular weight hydroxyl compounds or mixtures thereof with low molecular weight polyhydroxyl compounds of the type exemplified, observing an NCO/OH equivalent ratio of from 1.1:1 to 40:1, preferably from 2:1 to 25:1, with formation of urethane. If desired it is possible, when using an excess of distillable starting diisocyanate, to remove it by distillation following the reaction, so giving monomer-free NCO prepolymers, i.e. mixtures of starting diisocyanates (i) and true NCO prepolymers (iii), which can likewise be used as component (A).

In the preparation of the NCO prepolymers (iii) it is also possible to employ the said relatively high molecular weight polyols in blends with the said low molecular weight polyols, so resulting directly in mixtures of low molecular weight paint polyisocyanates (ii) containing urethane groups and relatively high molecular weight NCO prepolymers (iii).

The equivalent ratio of NCO-reactive groups of the polyortho ester from step A) to NCO groups of the polyisocyanate in B) is usually 1:1-1:40, preferably 1:1-1:10, more preferably 1:1-1:3,2.

The reaction of the isocyanate-reactive polyortho esters with the polyisocyanates takes place preferably at temperatures of 60-150° C., preferably 80-130° C.

If necessary it is possible in step B) to use the catalysts known per se to the skilled person from polyurethane chemistry in order to accelerate the NCO/OH reaction. Examples of such catalysts include organometallic compounds, amines (e.g. tertiary amines) or metal compounds such as lead octoate, mercury succinate, tin octoate or dibutyltin dilaurate.

If these catalysts are used, they are employed preferably in amounts of from 0.001 to 5% by weight, in particular 0.002 to 2% by weight, of catalyst, based on the total amount of polyortho ester and polyisocyanate.

Not only the transesterification (step A)) but also the reaction of isocyanate-reactive polyortho ester with the polyisocyanate (step B)) can take place in the presence of solvents and/or auxiliaries and additives.

Examples of suitable solvents include esters, such as ethyl acetate, butyl acetate, methoxypropyl acetate, methylglycol acetate, ethylglycol acetate, diethylene glycol monomethyl ether acetate; ketones, such as methyl ethyl ketone, methyl isobutyl ketone, methyl amyl ketone; aromatics, such as toluene and xylene, and also the relatively high-boiling hydrocarbon mixtures that are customary in paint chemistry.

Auxiliaries or additives present if desired may be, for example, surface-active substances, internal release agents, fillers, dyes, pigments, flame retardants, hydrolysis stabilizers, microbicides, flow assistants, antioxidants such as 2,6-di-tert-butyl-4-methylphenol, UV-absorbers of the 2-hydroxyphenylbenzotriazole type or light stabilizers of the type of the HALS compounds unsubstituted or substituted on the nitrogen atom, such as Tinuvin® 292 and Tinuvin® 770 DF (Ciba Spezialitäten GmbH, Lampertheim, DE) or other commercially customary stabilizers, as described for example in "Lichtschutzmittel für Lacke" (A. Valet, Vincentz Verlag, Hannover, 1996 and "Stabilization of Polymeric Materials" (H. Zweifel, Springer Verlag, Berlin, 1997, Appendix 3, pp. 181-213), or any desired mixtures of these compounds.

If desired, viscosity adjustments can be made by adding paint solvents known by the skilled worker from paint technology. In this context mention may be made, by way of example, of the following: ethyl acetate, butyl acetate, methoxypropyl acetate, methylglycol acetate, ethylglycol acetate, diethylene glycol monomethyl ether acetate; ketones, such as methyl ethyl ketone, methyl isobutyl ketone, methyl amyl ketone; aromatics, such as toluene and xylene, and also the relatively high-boiling hydrocarbon mixtures customary in paint chemistry.

The polymers containing polyortho ester and optionally NCO groups that are obtainable by the process of the invention have a number-average molecular weight $M_n$ of preferably from 500 to 3000 g/mol, more preferably from 500 to 2200 g/mol.

Any residual monomers of di- and/or triisocyanates that are still present following reaction of polyortho ester with polyisocyanate can be removed if desired, for example, by distillation, so that the polymers obtainable by the process of the invention contain residual monomer levels in terms of di- and/or triisocyanates of preferably <0.5% by weight.

The invention further provides polymers containing polyortho ester and optionally NCO groups, obtainable by the process of the invention.

The functional polymers of the invention constitute versatile starting materials for preparing low-viscosity, low-solvent polyurethane systems which are free from elimination products and can be formulated as one-component or multicomponent systems.

The invention therefore further provides coating compositions comprising
a) one or more polymers of the invention containing polyortho ester and optionally NCO groups,
b) optionally polyisocyanates
c) catalysts
d) optionally auxiliaries and additives.

Suitable polyisocyanates of component b) include all of the compounds already mentioned above under step B), individually or in any desired mixtures with one another.

As catalysts in c) it is possible to use individual catalyst types or else mixtures of two or more catalysts differing in reactivity.

To catalyze the deblocking reaction for releasing the masked OH groups use is made typically of acid compounds.

These may be, for example, the following: inorganic acids such as hydrogen chloride, sulphuric acid, nitric acid; sulphonic acids such as methanesulphonic acid, ethanesulphonic acid, para-toluenesulphonic acid, dodecylbenzenesulphonic acid, dinonylnaphthalenesulphonic acid and dinonylnaphthalenedisulphonic acid; carboxylic acids such as formic acid, acetic acid, propionic acid, butanoic acid, 2-ethylhexanoic acid and octanoic acid; organic compounds based on phosphoric acid, such as monobutyl phosphate, dibutyl phosphate, monoisopropyl phosphates, diisopropyl phosphates, monooctyl phosphates, dioctyl phosphates, monodecyl phosphates, didecyl phosphates, metaphosphoric acid, orthophosphoric acid, pyrophosphoric acid, trimethyl phosphates, triethyl phosphate, tributyl phosphates, trioctyl phosphate, tributoxyethyl phosphates, trischloroethyl phosphate, triphenyl phosphate and tricresyl phosphate, and also Lewis acids.

Additionally it is also possible to use neutralization products of the abovementioned acids with amines in component c) as acid catalysts.

Likewise possible is the use of sulphonic esters of the aforementioned sulphonic acids with primary, secondary or tertiary alcohols such as n-propanol, n-butanol, n-hexanol, n-octanol, isopropanol, 2-butanol, 2-hexanol, 2-octanol, cyclohexanol, tert-butanol and also the reaction products of the said sulphonic acids with compounds containing oxirane groups such as glycidyl acetate or butyl glycidyl ether, giving β-hydroxyalkylsulphonic esters.

As acid catalysts it is preferred in component c) to use the above-mentioned compounds based on sulphonic acid and based on phosphoric acid.

Very particular preference is given to the use of dodecylbenzenesulphonic acid.

Besides the acid catalysts it is also possible in c) to use catalysts for accelerating the NCO/OH reaction of released latent OH groups with NCO groups. These catalysts are known per se to the skilled worker from polyurethane chemistry. They may be, for example, the following: tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octoate, tin(II) ethylcaproate, tin(II) palmitate, dibutyltin(IV) dilaurate and molybdenum glycolate or any desired mixtures of such catalysts.

In c) it is preferred to use a combination of acid- and NCO/OH-accelerating catalysts.

The amount of component c) relative to the amount of the compounds of components a) and b) is typically from 0.001 to 5% by weight, preferably from 0.01 to 1% by weight.

Auxiliaries or additives present in component d) if desired may be, for example, surface-active substances, internal release agents, fillers, dyes, pigments, flame retardants, hydrolysis stabilizers, microbicides, flow assistants, antioxidants such as 2,6-di-tert-butyl-4-methylphenol, UV-absorbers of the 2-hydroxyphenylbenzotriazole type or light stabilizers of the type of the HALS compounds unsubstituted or substituted on the nitrogen atom, such as Tinuvin® 292 and Tinuvin® 770 DF (Ciba Spezialitäten GmbH, Lampertheim, DE) or other commercially customary stabilizers, as described for example in "Lichtschutzmittel für Lacke" (A. Valet, Vincentz Verlag, Hannover, 1996 and "Stabilization of Polymeric Materials" (H. Zweifel, Springer Verlag, Berlin, 1997, Appendix 3, pp. 181-213), or any desired mixtures of these compounds.

In the preparation of the coating compositions of the invention, components a) and b) are mixed with one another in proportions such as to result preferably in an equivalent ratio of NCO groups to latent OH groups of from 0.5:1 to 2.0:1, more preferably from 0.8:1 to 1.5:1, with very particular preference 1:1.

During or after the mixing of the individual components a) and b) the catalyst component c) and, if appropriate, the customary auxiliaries and additives are mixed in.

Coating compositions based on the polymers of the invention containing polyortho ester and optionally NCO groups are suitable for coating a multiplicity of materials and substrates, such as metal, glass, wood, plastics or concrete, for example.

The coating compositions of the invention can be applied to any desired substrates by methods which are known per se, such as, for example, by spraying, brushing, flow coating or by using rolls or coating knives.

Examples of suitable substrates include metal, wood, glass, stone, ceramic materials, concrete, rigid and flexible plastics, textiles, leather or paper.

Curing following application can be performed at room temperature or at elevated temperature.

EXAMPLES

All amounts are to be understood as being by weight (grams) unless noted otherwise. All percentages, unless noted to the contrary, are to be understood as being percent by weight.

The NCO content of the resins described in the inventive and comparative examples was determined by titration in accordance with DIN 53 185.

Hydrolysis of the blocked OH groups takes place in accordance with the following equation:

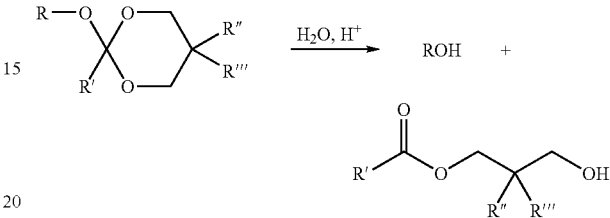

1 mol of OH groups blocked with acyclic ortho esters thus give 2 free OH groups after hydrolysis.

Accordingly the latent OH group content can be calculated theoretically in accordance with the following equation:

$$\text{OH content} = \frac{2 \cdot 17 \cdot 100 \cdot \frac{\text{Initial mass } A1}{\text{Molar mass } A1}}{\text{Initial mass } A1 + \text{Initial mass } A2 + \text{Initial mass } A3 - 3 \cdot 18 \cdot \text{mol } A1 + \text{Initial mass } B}$$

To monitor the NCO conversion, samples of the reaction solution were measured using an FT-IR spectrometer (Perkin Elmer, Paragon® 1000, GB) and the presence of free NCO groups was detected on the basis of the NCO band at 2270 cm$^{-1}$.

The dynamic viscosities were determined at 23° C. using a rotational viscometer (ViscoTester® 550, Thermo Haake GmbH, D-76227 Karlsruhe) at a shear rate of 40 s$^{-1}$.

The König pendulum hardness was determined in accordance with DIN 53157.

Solids content was determined in accordance with DIN EN ISO 3251 (1 g of sample, drying time in a forced-air oven: 1 hour at 125° C.).

As a measure of the processing life the efflux time was determined in accordance with DIN 53211.

The drying rate was determined in accordance with DIN 53150 and DIN EN ISO 1517.

Reactants:
TEOP: triethyl orthopropionate
TEOA: triethyl orthoacetate
BEPD: 2-butyl-2-ethyl-1,3-propanediol
pTSA: para-toluenesulphonic acid
MPA: methoxypropyl acetate
DBTL: dibutyltin dilaurate
HDI: hexamethylene diisocyanate
IPDI: isophorone diisocyanate
Byk® 333, 355, 331 and 141: flow assistants from Byk Chemie, Wesel, DE Polyisocyanates Employed Polyisocyanate A:
Desmodur® VPLS 2102: HDI allophanate having an NCO content of 20.0% and a viscosity at 23° C. of 300 mPa·s, Bayer MaterialScience AG, Leverkusen, DE.

Polyisocyanate B:

Desmodur® N3300: HDI uretdione having an NCO content of 21.8% and a viscosity at 23° C. of 170 mPa·s, Bayer MaterialScience AG, Leverkusen, DE.

Polyisocyanate C:

Desmodur® N3600: HDI trimer having an NCO content of 23.0% and a viscosity at 23° C. of 1200 mPa·s, Bayer MaterialScience AG, Leverkusen, DE.

Polyisocyanate D:

Desmodur® N3200: HDI biuret having an NCO content of 23.0% and a viscosity at 23° C. of 2 500 mPa·s, Bayer MaterialScience AG, Leverkusen, DE.

Polyisocyanate E:

Desmodur® VPLS 2138: IPDI n-butanol trimer/allophanate, 80% in butyl acetate, having an NCO content of 11.5% and a viscosity of 1 500 mPa·s, Bayer MaterialScience AG, Leverkusen, DE.

Polyisocyanate F:

Desmodur® N3390, HDI trimer, 90% in butyl acetate, having an NCO content of 19.6% and a viscosity at 23° C. of 650 mPas, Bayer MaterialScience AG, Leverkusen, DE.

Preparation of Polyortho Ester-polyisocyanate Adducts

Part 1 of the reactants for preparing the adduct were weighed out together in accordance with Tables 1 and 2 below into a reactor equipped with stirrer, heating, automatic temperature control, nitrogen inlet and distillation column, and were heated to 85° C. with stirring, in the course of which nitrogen was passed through. The temperature was slowly raised to 120° C., with ethanol being removed by distillation. After 4 to 6 hours the distillation of ethanol was at an end and a reduced pressure of 500 mbar was applied at 120° C. in order to distill off the remaining ethanol. Subsequently butyl acetate (part 2) was added. Then at 120° C. the diisocyanate (part 3) was added dropwise and the reaction was continued at 120° C. until the NCO band in the IR had disappeared. Finally the polyisocyanate (part 4) was added dropwise at 120° C. and stirring was continued until the theoretical NCO content was reached.

TABLE 1

Polyortho ester-polyisocyanate adducts (NCO-containing)

| | Adduct | | | |
|---|---|---|---|---|
| | 1 | 2 | 3 | 4 |
| Part 1: | | | | |
| TEOP | 176 g | — | — | — |
| TEOA | — | 162 g | 162 g | 162 g |
| Pentaerythritol | 136 g | 136 g | 136 g | 68 g |
| BEPD | — | — | — | 160 g |
| pTSA | 0.3 g | — | — | — |
| Ethanol | −138 g | −138 g | −138 g | −138 g |
| Part 2 | | | | |
| Butyl acetate | 169 g | 198 g | 185 g | 200 g |
| Part 3 | | | | |
| HDI | 42 g | — | — | — |
| IPDI | — | — | — | — |
| Part 4 | | | | |
| Polyisocyanate A | — | 630 g | — | — |
| Polyisocyanate B | 457.5 g | — | 579 g | — |
| Polyisocyanate C | — | — | — | 549 g |
| Solids | 80% | 80% | 80% | 80% |
| NCO content | 9.4% | 8.0% | 8.9% | 8.0% |
| Latent OH content | 4.0% | 3.4% | 3.7% | 3.3% |
| Viscosity @ 23° C. | 977 mPas | 380 mPas | 370 mPas | 1685 mPas |

TABLE 2

Polyortho ester polyisocyanate adduct (NCO-free)

| | Adduct | | | | | | |
|---|---|---|---|---|---|---|---|
| | 5 | 6 | 7 | 8 | 9 | 10 | 11 |
| Part 1 | | | | | | | |
| TEOA | 162 g | 162 g | 162 g | 162 g | 162 g | 162 g | 162 g |
| Pentaerythritol | 136 g | 68 g | 102 g | 102 g | 102 g | 102 g | 102 g |
| BEPD | — | 160 g | 80 g | 80 g | — | — | — |
| TMPD | — | — | — | — | 73 g | — | — |
| NPG | — | — | — | — | — | 52 g | — |
| TMP | — | — | — | — | — | — | 44.7 g |
| pTSA | 0.1 g | — | — | — | — | — | — |
| Ethanol | −138 g | −138 g | −138 g | −138 g | −138 g | −138 g | −138 g |
| Part 2 | | | | | | | |
| Butyl acetate | 200 g | 234 g | 190 g | 209 g | 206 g | 194 g | 171 g |
| Part 3 | | | | | | | |
| HDI | — | — | — | — | — | — | — |
| IPDI | — | — | 55.5 g | — | — | — | 55.5 g |
| Part 4 | | | | | | | |
| Polyisocyanate A | 210 g | — | — | — | — | — | — |
| Polyisocyanate B | — | — | — | — | — | — | — |

TABLE 2-continued

Polyortho ester polyisocyanate adduct (NCO-free)

| | Adduct | | | | | | |
|---|---|---|---|---|---|---|---|
| | 5 | 6 | 7 | 8 | 9 | 10 | 11 |
| Polyisocyanate C | — | 183 g | 91.5 g | 183 g | 183 g | 183 g | 91.5 g |
| Solids | 65% | 65% | 65% | 65% | 65% | 65% | 65% |
| NCO content | 0% | 0% | 0% | 0% | 0% | 0% | 2% |
| Latent OH content | 6.0% | 5.1% | 6.3% | 5.7% | 5.8% | 6.1% | 7.0% |
| Viscosity @ 23° C. | 780 mPas | 1290 mPas | 498 mPas | 1565 mPas | 3787 mPas | 935 mPas | 1645 mPas |

Preparation of Comparative Polyortho Esters 16 and 17

The reactants for preparing the polyortho ester were weighed out together in accordance with Table 3 below into a reactor equipped with stirrer, heating, automatic temperature control, nitrogen inlet and distillation column and were heated to 85° C. with stirring, in the course of which nitrogen was passed through. The temperature was slowly raised to 150° C., with ethanol being removed by distillation. After 4 to 6 hours the distillation of ethanol is at an end and a reduced pressure of 500 mbar was applied at 150° C. in order to distill off the remaining ethanol.

In the case of adducts 13 to 15, different, non-inventive diols were used in component A3). The reaction mixtures gelled.

The behaviours of adducts 12-15 show very clearly that only when using the polyol combination of the invention is it possible to obtain systems which are stable on storage as a result of components A2) and A3). Far from all of the polyols and combinations specified for example in EP-A 1 225 172 are therefore suitable for the synthesis of the polymers of the invention.

TABLE 3

Polyortho ester-polyisocyanate adducts

| | Adduct | | | | | |
|---|---|---|---|---|---|---|
| | 12 | 13 | 14 | 15 | 16 | 17 |
| Part 1: | | | | | | |
| TEOA | 162 g | 162 g | 162 g | 162 g | 162 g | — |
| TEOF | — | — | — | — | — | 148 g |
| Pentaerythritol | — | 102 g | 102 g | 68 g | 33.5 g | — |
| TMP | 178.7 g | — | — | — | — | — |
| Ethylene glycol | — | 31 g | — | — | — | — |
| 1,2-Hexanediol | — | — | 59 g | — | — | — |
| CHDM | — | — | — | 72 g | — | — |
| BEPD | — | — | — | — | 160 g | 160 g |
| Formic acid 90% in wasser | — | — | — | — | 1 g | 1 g |
| Ethanol | −138 g | −138 g | −138 g | −138 g | −138 g | −138 g |
| Part 2 | | | | | | |
| Butyl acetate | 208 g | 183 g | 198 g | 187 g | 0 g | 0 g |
| Part 3 | | | | | | |
| HDI | — | — | — | — | — | — |
| IPDI | — | — | — | — | — | — |
| Part 4 | | | | | | |
| Polyisocyanate C | 183 g | 183 g | 183 g | 183 g | — | — |
| Solids | 65% | 65% | 65% | 65% | 100% | 100% |
| NCO content | 0% | 0% | 0% | 0% | — | — |
| Latent OH content | 5.7% | 6.5% | 6.0% | 6.4% | 15.8% | 17.0% |
| Viscosity 23° C. (mPa · s) | gelled | gelled | gelled | gelled | 642 mPas | 458 mPas |

In the case of adduct 12, instead of a polyol A2) with an OH functionality of 4-8, trimethylolpropane with an OH functionality of 3 was used, but gelling of the reaction mixture was observed.

Acrylate Polyol (Comparative):

Polyacrylate polyol in solution in butyl acetate, having a solids content of 70% by weight, a hydroxyl content of 2.8% by weight and a viscosity at 23° C. of 1 200 mPa·s (VPLS 2350, experimental product from Bayer MaterialScience AG, Leverkusen, DE).

Paint Preparation

The adducts from Tables 1, 2 and 3 above were admixed as per Tables 4 and 5 with commercially customary paint additives, catalysts and optionally polyisocyanates, with stirring, and then were applied to glass using a 150 μm coating knife and cured at 60° C. for 10 minutes.

The petroleum resistance of the paint films thus produced was determined by placing a cotton pad soaked with commercially customary Super-grade petroleum on the applied paint film for 1 minute and 5 minutes, respectively. After this time the paint film was wiped dry with a cloth and assessed visually using a grading from 0-5. (no change, 5:severe swelling). Additionally, after the samples have been stored at room temperature for one day, this test was repeated (measurements in brackets).

TABLE 4

Coating & performance data

| | Example | | | | | |
|---|---|---|---|---|---|---|
| | 1 | 2 | 3 | 4 | 5 | 6 |
| Adduct 1 | 72.12 g | — | — | — | — | — |
| Adduct 2 | — | 100 g | — | — | — | — |
| Adduct 3 | — | — | 100 g | — | — | — |
| Adduct 4 | — | — | — | 58.14 g | — | — |
| Adduct 5 | — | — | — | — | 100 g | — |
| Adduct 6 | — | — | — | — | — | 100 g |
| Byk ® 331 | 0.12 g | 0.16 g | 0.16 g | 0.10 g | 0.26 g | 0.11 g |
| Byk ® 141 | 0.72 g | 1.00 g | 1.00 g | 0.62 g | 1.62 g | 0.66 g |
| DBTL | 0.58 g | 1.60 g | 1.60 g | 0.99 g | 2.59 g | 1.06 g |
| MPA/xylene/BA 1:1:1 | 20.52 g | 35.00 g | 32.00 g | 34.38 g | 81.63 g | 28.61 g |
| Polyisocyanate D | — | — | — | 2.87 g | 64.45 g | 26.45 g |
| Dodecylbenzenesulphonic acid | 3.61 g | 5.00 g | 5.00 g | 2.91 g | 5.00 g | 2.05 g |
| Solids | 60% | 57% | 58% | 50% | 51% | 53.5% |
| Efflux time DIN4 (sec) after | | | | | | |
| 0.0 h | 20 | 21 | 21 | 18 | 22 | 22 |
| 1.0 | 20 | 19 | 20 | 18 | 25 | 23 |
| 2.0 | 20 | 19 | 19 | 18 | 29 | 24 |
| 3.0 | 20 | 20 | 19 | 19 | 31 | 27 |
| 4.0 | 20 | 20 | 20 | 21 | 35 | 32 |
| Drying time 10 min 60° C. | 0/0 | 0/0 | 0/0 | 0/0 | 0/0 | 0/0 |
| T1 + min | 0 | 0 | 0 | 0 | 0 | 0 |
| T3 + h | 0 | 0 | 0 | 0 | 0 | 0 |
| T4 + h | 0 | 0 | 0 | 0 | 0 | 0 |
| Pendulum hardness | 62 s | 52 s | 50 s | 28 s | 112 s | 55 s |
| Petroleum resistance 1 min/5 min | 0/0 (2/3) | 0/0 (2/3) | 0/0 (2/3) | 1/1 (2/4) | 0/0 (2/4) | 1/1 (3/4) |

| | Example | | | | |
|---|---|---|---|---|---|
| | 7 | 8 | 9* | 10* | 11* |
| Adduct 8 | 100 g | 100 g | — | — | — |
| Adduct 16 | — | — | 27.64 g | — | — |
| Adduct 17 | — | — | — | 25.26 g | — |
| Acrylate polyol | — | — | — | — | 56.28 g |
| Byk ® 333 | — | — | — | — | 0.72 g |
| Byk ® 355 | — | — | — | — | 0.51 g |
| Byk ® 331 | 0.27 g | 0.35 g | 0.15 g | 0.14 g | — |
| Byk ® 141 | 0.33 g | 0.43 g | 0.93 g | 0.89 g | 0.51 g |
| DBTL | 2.64 g | 3.47 g | 1.49 g | 1.43 g | 0.16 g |
| MPA/xylene/BA 1:1:1 | 55.68 g | 41.99 g | 21.5 g | 24.89 g | 30.26 g |
| Polyisocyanate D | 67.66 g | — | 46.91 g | 46.12 g | — |
| Polyisocyanate E | — | 135.3 g | — | — | — |
| Polyisocyanate F | — | — | — | — | 20.62 g |
| Dodecylbenzenesulphonic acid | 5.00 g | 5.00 g | 1.38 g | 1.26 g | — |
| Solids | 57.7% | 60.8% | 75% | 72% | 58% |
| Efflux time DIN2 (sec) after | | | | | |
| 0.0 h | 20 | 20 | 22 | 20 | 20 |
| 1.0 | 28 | 20 | 34 | 30 | 21 |
| 2.0 | 34 | 25 | 43 | 48 | 23 |
| 3.0 | 34 | 26 | 45 | 55 | 32 |
| 4.0 | 35 | 28 | 46 | 68 | 37 |
| 6.0 | 36 | 31 | | | |
| Drying time 10 min 60° C. | 1/0 | 0/0 | 5/3 | 5/3 | 4/1 |
| T1 + min | 0 | 0 | 4.5 | 7 | 0 |
| T3 + h | 0.5 | 0 | >7 | >7 | 6 |
| T4 + h | 2 | 0 | >7 | >7 | >6 |
| Pendulum hardness | 68 s | 139 s | 69 s | 133 s | 109 s |

TABLE 4-continued

| | Coating & performance data | | | | |
|---|---|---|---|---|---|
| Petroleum resistance after 1 min/5 min | 0/1 (2/3) | 2/3 (5/5) | 3/3 (4/4) | 2/3 (5/5) | 4/4 (5/5) |

0 = no change,
5 = severe swelling

As is very clear from the efflux times, as a measure of the processing properties, and the drying times after application, the paint systems based on polyortho esters in accordance with the invention (Examples 1-8) are distinguished by high application reliability and fast drying behaviour as compared with the comparative systems 9-11. The paints of the invention also have much better petroleum resistance than the comparative paints of Examples 9-11.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing polymers containing polyortho ester groups and NOG groups comprising reacting A) and B) prior to any hydrolysis of the polyortho ester groups, wherein
    A) is a polyortho ester containing at least one unblocked hydroxyl group prepared by reacting
        A1) one or more acyclic ortho esters with
        A2) low molecular weight polyols having a functionality of 4-8 and a number-average molecular weight of 80-500 g/mol and
        A3) optionally a 1,3-diol and/or a triol, the hydroxyl groups being separated from one another by at least 3 carbon atoms, optionally in the presence of
        A4) catalysts and
    B) is at least one polyisocyanate.

2. The process for preparing polymers containing polyortho ester and NCO groups according to claim 1, wherein the components in step A) are
    A1) triethyl orthoacetate and/or triethyl orthopropionate;
    A2) pentaerythritol; and
    A3) a trial or dial selected from the group consisting of neapentyl glycal, 2-methyl-1,3-propanediol, 2-methyl-2,4-pentanediol, 3-methyl-1,3-butanediol, 2-ethyl-1,3-hexanedial, 2,2-diethyl-1,3-prapanediol, 2,2,4-trimethyl-1,3-pentanediol, 2-butyl-2-ethyl-1,3-prapanediol, trimethylolpropane and mixtures thereof with one another.

3. The process for preparing polymers containing polyortho ester and NCO groups according to claim 2, wherein the catalyst in step A) is p-toluenesulphonic acid.

4. The process for preparing polymers containing polyortho ester and NCO groups according to claim 2, wherein the equivalent ratio of groups of the compounds of component A1) to be transesterified to the OH groups of the compounds of components A2) and A3) is from 1:1.3 to 1:1.5.

5. The process for preparing polymers containing polyortho ester and NCO groups according to claim 2, wherein the equivalent ratio of NCO-reactive groups of the polyortho ester from step A) to NOC groups of the polyisocyanate in step B) is 1:1-1:3.2.

6. The process for preparing polymers containing polyortho ester and NCO groups according to claim 2, wherein the polymers containing polyortho ester and NCO groups thus obtained have a number-average molecular weight $M_n$ of from 500 to 3000 g/mol.

7. Polymers containing polyortho ester and NCO groups, obtained by the process according to claim 2.

8. Coating compositions comprising
    a) one or more polymers containing polyortho ester and NCO groups according to claim 7,
    b) optionally polyisocyanates,
    c) catalysts, and
    d) optionally auxiliaries and additives selected from the group consisting of solvents, surface-active substances, internal release agents, fillers, dyes, pigments, flame retardants, hydrolysis stabilizers, microbiocides, flow assistants, antioxidants, UV-absorbers, and combinations thereof.

9. Coatings obtained from polymers containing polyortho ester and NCO groups according to claim 7.

10. Substrates coated with coatings according to claim 9.

11. The process far preparing polymers containing palyortha ester and NCO groups according to claim 1, wherein the catalyst in step A) is p-toluenesulphonic acid.

12. The process for preparing polymers containing polyortho ester and NCO groups according to claim 1, wherein the equivalent ratio of groups of the compounds of component A1) to be transesterifled to the OH groups of the compounds of components A2) and A3)is from 1:1.3 to 1:1.5.

13. The process for preparing polymers containing polyortho ester and NCO groups according to claim 1, wherein the equivalent ratio of NCO-reactive groups of the polyortho ester from step A) to NCO groups of the polyisocyanate in step B) is 1:1-1:3.2.

14. The process for preparing polymers containing polyortho ester and NCO groups according to claim 1, wherein the polymers containing polyortho ester and NCO groups thus obtained have a number-average molecular weight $M_n$ of from 500 to 3000 glmol.

15. Polymers containing polyartha ester and NCO groups, obtained by the process according to claim 1.

16. A method of producing coatings, adhesive bonds and/or seals comprising combining the polymers containing polyortho ester and NCO groups according to claim 15 with one or more aauxiliaries or additives selected from the group consisting of solvents, surface-active substances, internal release agents, fillers, dyes, pigments, flame retardants, hydrolysis stabilizers, microbiocides, flow assistants, antioxidants, UV-absorbers, and combinations thereof.

17. Coating compositions comprising
a) one or more polymers containing polyortho ester and NCO groups according to claim 15,
b) optionally polyisocyanates,
c) catalysts, and
d) optionally auxiliaries and additives selected from the group consisting of solvents, surface-active substances, internal release agents, fillers, dyes, pigments, flame retardants, hydrolysis stabilizers, microbiocides, flow assistants, antioxidants, UV-absorbers, and combinations thereof.

18. Coatings obtained from polymers containing polyortho ester and NCO groups according to claim 15.

19. Substrates coated with coatings according to claim 18.

* * * * *